(12) United States Patent
Liao et al.

(10) Patent No.: US 7,760,600 B2
(45) Date of Patent: Jul. 20, 2010

(54) METHOD FOR TESTING A BURNER AND A REWRITER DISK

(75) Inventors: Shan-Ming Liao, Shenzhen (CN); Ren-Bo Huang, Shenzhen (CN); Xiao-Lin Gan, Shenzhen (CN); Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 574 days.

(21) Appl. No.: 11/778,078

(22) Filed: Jul. 16, 2007

(65) Prior Publication Data

US 2008/0130440 A1 Jun. 5, 2008

(30) Foreign Application Priority Data

Dec. 1, 2006 (CN) .................... 2006 1 0157198

(51) Int. Cl.
*G11B 5/58* (2006.01)
*G11B 15/04* (2006.01)
*G11B 19/04* (2006.01)
*G11C 29/00* (2006.01)

(52) U.S. Cl. ............... 369/53.2; 714/718; 714/719; 714/723

(58) Field of Classification Search ............. 369/53.2; 714/718, 719, 723
See application file for complete search history.

(56) References Cited

U.S. PATENT DOCUMENTS

| 5,185,733 | A | * | 2/1993 | Finkelstein et al. | ....... 369/47.52 |
| 5,422,890 | A | * | 6/1995 | Klingsporn et al. | ......... 714/723 |
| 5,530,687 | A | * | 6/1996 | Yamaguchi | .............. 369/53.36 |
| 5,914,967 | A | * | 6/1999 | Yomtoubian | ................. 714/718 |
| 6,222,984 | B1 | | 4/2001 | Kim et al. | |
| 6,877,118 | B2 | * | 4/2005 | Oshima et al. | ............... 714/719 |
| 7,263,047 | B2 | * | 8/2007 | Huang | ...................... 369/53.31 |
| 2002/0054552 | A1 | * | 5/2002 | Ohtsuka | .................. 369/47.53 |

FOREIGN PATENT DOCUMENTS

JP 2002251841 A * 9/2002

* cited by examiner

*Primary Examiner*—Daniell L Negrón
*Assistant Examiner*—Nicholas Lee
(74) *Attorney, Agent, or Firm*—Frank R. Niranjan

(57) ABSTRACT

A method for testing a burner includes the steps of: providing a rewriter (RW) disk (4) in good burning condition, and inserting the RW disk into a test burner (3) connected to a computer (1); selecting a burner type for the burner; designating a source file to be burned, and setting a counter J=0, a loop time N and a maximum time of fail test M; erasing all data on the RW disk; burning the source file onto the RW disk; determining whether the source file is successfully burned to the RW disk; executing J=J+1 if the source file is successfully burned to the RW disk; repeating the erasing step, the burning step and the determining step, and counting a time of successfully burned process by the counter J, until J=N−M+1 which denotes that the burner is in good burning condition. A related method for testing a RW disk is also provided.

14 Claims, 3 Drawing Sheets

METHOD FOR TESTING A BURNER AND A REWRITER DISK

BACKGROUND OF THE INVENTION

1. Field of the Invention

The present invention relates to a method for testing the performance of a burner and a rewriter (RW) disk.

2. Description of Related Art

An optical disk is a plastic-coated disk that stores digital data in tiny pits on its surface, such as music or text files. The disk is rotated rapidly, and a laser is reflected off the disk to an optical sensor, which is sampled periodically. If the laser strikes flat area between the pits, the sensor picks up the reflection and registers the digital value 1. If the laser strikes one of the pits, it will deflect from the sensor, and the sample value is set at digital 0.

According to a mode of burning data, the optical disk includes three of the following types: read-only disk, burnable disk, and rewriter disk (RW disk). A burner is being described as a machine that writes the optical disks. One method in the art for testing a burner and a RW disk is implemented by utilizing common software, such as Nero, Easy CD Creator, Sonic or CD Copy. However, this method has more or less disadvantages. For example, the method could not recognize loop tests, thus relatively lacking the reliability of the test result.

Accordingly, what is needed is a method for testing a burner and a RW disk, which can test a burner and a RW disk automatically, and improve the reliability of test result.

SUMMARY OF THE INVENTION

One preferred embodiment provides a method for testing a burner. The method includes the steps of: providing a rewriter (RW) disk in good burning condition, and inserting the RW disk into a test burner connected to a computer; selecting a burner type for the burner; designating a source file to be burned, and setting a counter J=0, a loop time N and a maximum time of fail test M; erasing all data on the RW disk; burning the source file onto the RW disk; determining whether the source file is successfully burned to the RW disk; executing J=J+1 if the source file is successfully burned to the RW disk; repeating the erasing step, the burning step and the determining step, and counting a time of successfully burned process by the counter J, until J=N−M+1 which denotes that the burner is in good burning condition.

Another preferred embodiment provides a method for testing a RW disk. The method includes the steps of: providing a burner in good burning condition, and inserting a test RW disk into the burner that is connected to a computer; selecting a disk type for the test RW disk; designating a source file to be burned, and setting a counter J=0, a loop time N and a maximum time of fail test M; erasing all data on the RW disk; burning the source file onto the RW disk; determining whether the source file is successfully burned to the RW disk; executing J=J+1 if the source file is successfully burned to the RW disk; repeating the erasing step, the burning step and the determining step, and counting a time of successfully burned process by the counter J, until J=N−M+1 which denotes that the RW disk is in good burning condition.

Other systems, methods, features, and advantages will be or become apparent to one skilled in the art upon examination of the following drawings and detailed description.

DETAILED DESCRIPTION OF THE INVENTION

Figure 1:
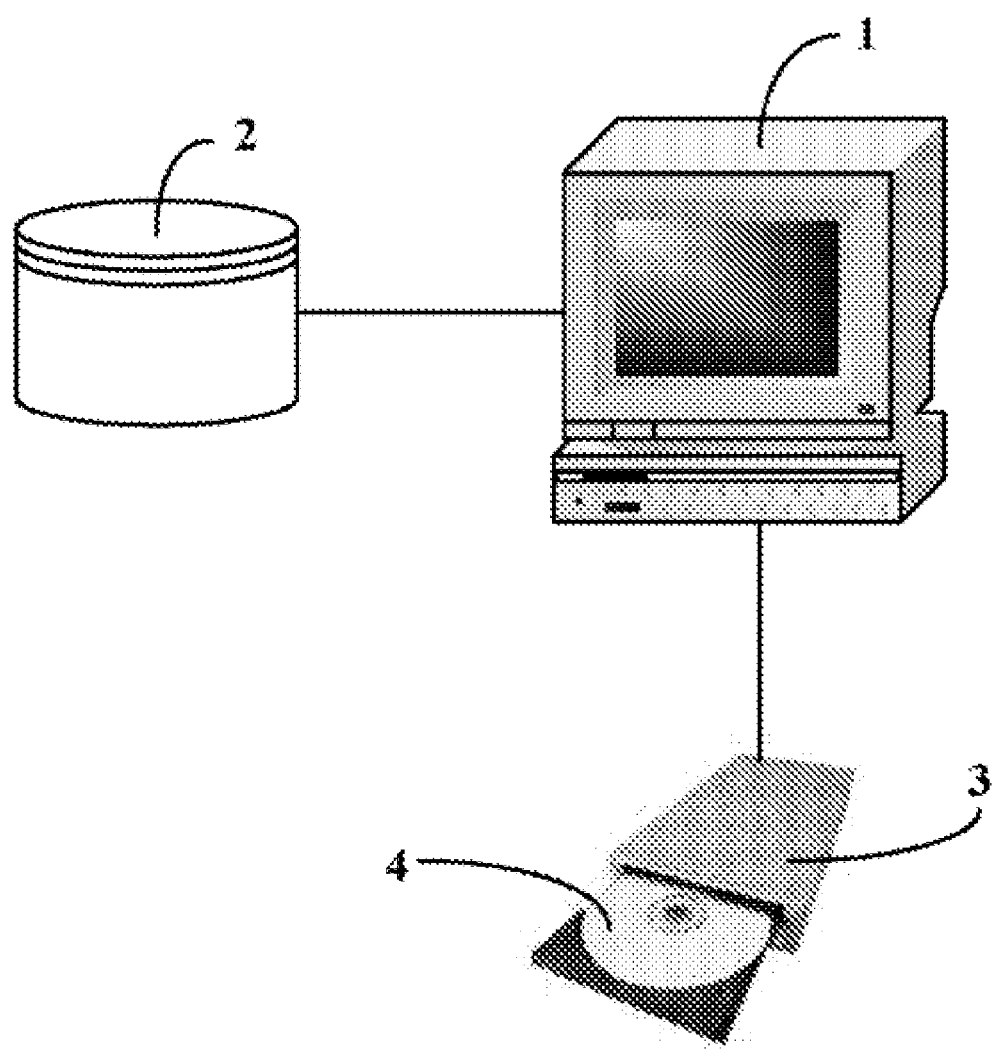
FIG. 1 is a schematic diagram illustrates application environment of a method for testing a burner and a RW disk in accordance with one preferred embodiment.

FIG. 1 is a schematic diagram illustrates application environment of a method for testing a burner and a RW disk in accordance with one preferred embodiment. The application environment may typically include a computer 1, a database 2 connected to the computer 1, a burner 3 connected to the computer 1, and a RW disk 4.

The database 2 stores a source file and the computer 1 is configured (i.e., structured and arranged) to loop test the burner 3 and the RW disk 4. The burner 3 may be a COMBO burner, a CDRW burner, a DVDRW burner, a DVD-SuperMulti burner, a Blu-Ray burner or a HD DVD burner. The RW disk 4 may be a CD-RW disk, a DVD-RW disk, a DVD+RW disk, a DVD-RAM disk, a BD-RE disk or a HD DVD-RW disk.

Figure 2:
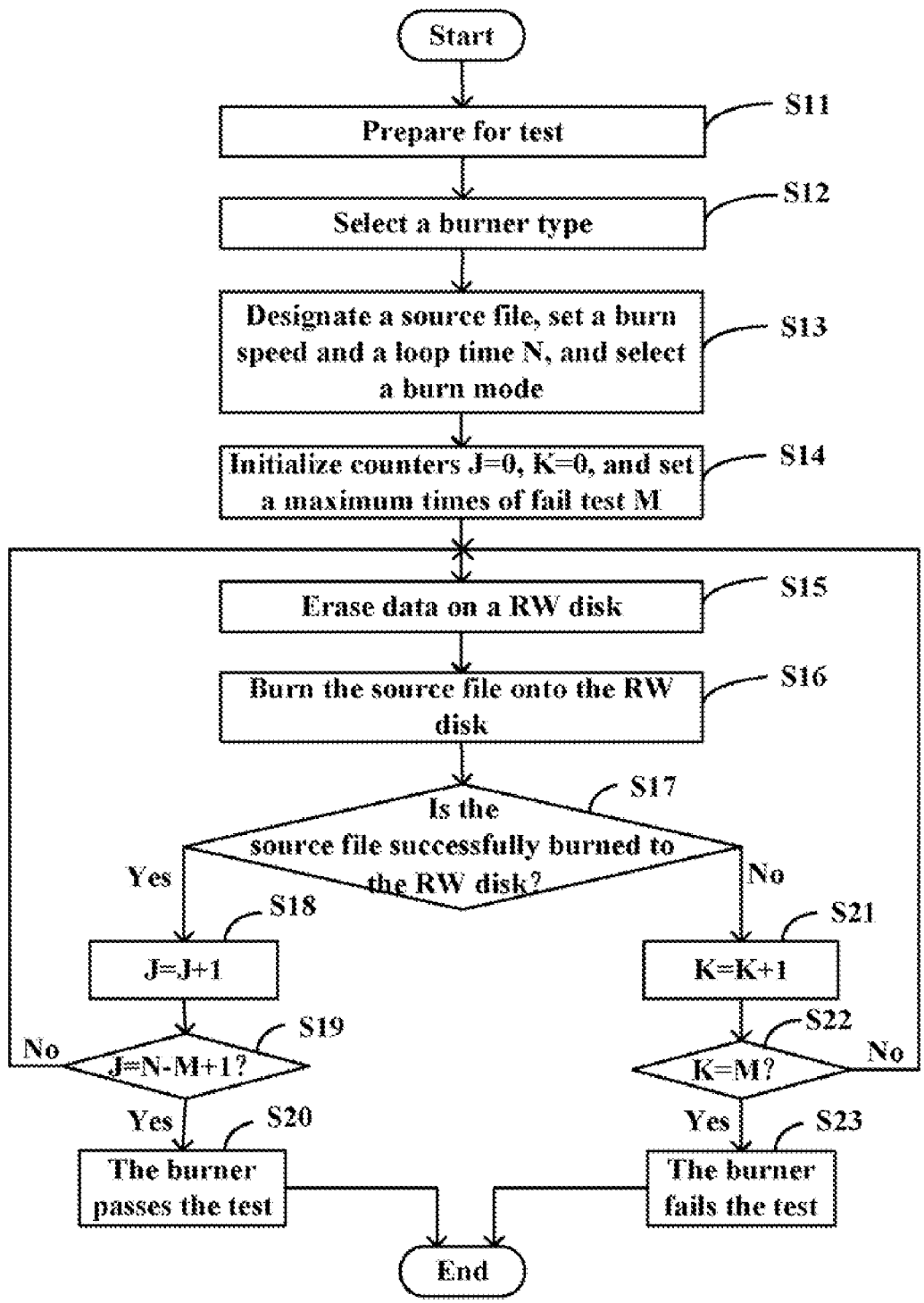
FIG. 2 is a flowchart of a method for testing a burner in accordance with one preferred embodiment.

FIG. 2 is a flowchart of a method for testing the burner 3 in accordance with one preferred embodiment.

In step S11, the test preparations mainly includes: providing the RW disk 4 in good burning condition in the preferred embodiment, inserting the RW disk 4 into the burner 3 to be tested this occurrence, and connecting the burner 3 to the computer 1.

In step S12, a burner type is selected for the burner 3. Depending on the actual type of burner 3, it can consist of COMBO, CDRW, DVDRW, DVD-SuperMulti, Blue-Ray and HD DVD. For example, if the to-be-tested burner 3 is a COMBO burner, COMBO would be selected as the burner type in step S12.

In step S13, the source file in the database 2 is designated to be burned, a burn speed and a loop time N are set, and a burn mode for the test is selected. The source file can be any type of files to the limitation of not exceeding the capacity of the RW disk 4. The burn speed set in step S13 is limited within the maximal burn speed of the burner 3 and the RW disk 4 in accordance to the specification thereof. The burn mode may be a disk-at-once (DAO) mode, a track-at-once (TAO) mode, a session-at-once (SAO) mode, a packet writing mode and a on the fly (OTF) mode.

In step S14, counters J and K are initialized as J=0, K=0, and a maximum time of fail test M is set while M should be a positive integer. The counter J is configured for counting a time of successfully burned process, and the counter K is configured for counting a time of failed burn process. If J=N−M+1 in the preferred embodiment, the burner 3 passes test, which denotes that it is in good burning condition.

In step S15, all data on the RW disk 4 are erased.

In step S16, the source file is burned onto the RW disk 4.

In step S17, it is to determine whether the source file is successfully burned to the RW disk 4.

In step S18, executing J=J+1 if the source file is successfully burned to the RW disk 4.

In step S19, it is to determine whether j=N−M+1.

In step S20, if J=N−M+1, the burner 3 passes the test, which denotes that it is in good burning condition.

In step S21, executing K=K+1 if the source file failed to burn onto the RW disk 4 in step S17.

In step S22, it is to determine whether K=M.

In step S23, if K=M, the burner 3 fails to pass the test, which denotes that the burner 3 is defective in burning disks.

If the determined result of step S19 is J≠N−M+1, return the procedure to step S15.

If the determined result of step S22 is K#M, return the procedure to step S15.

Figure 3:
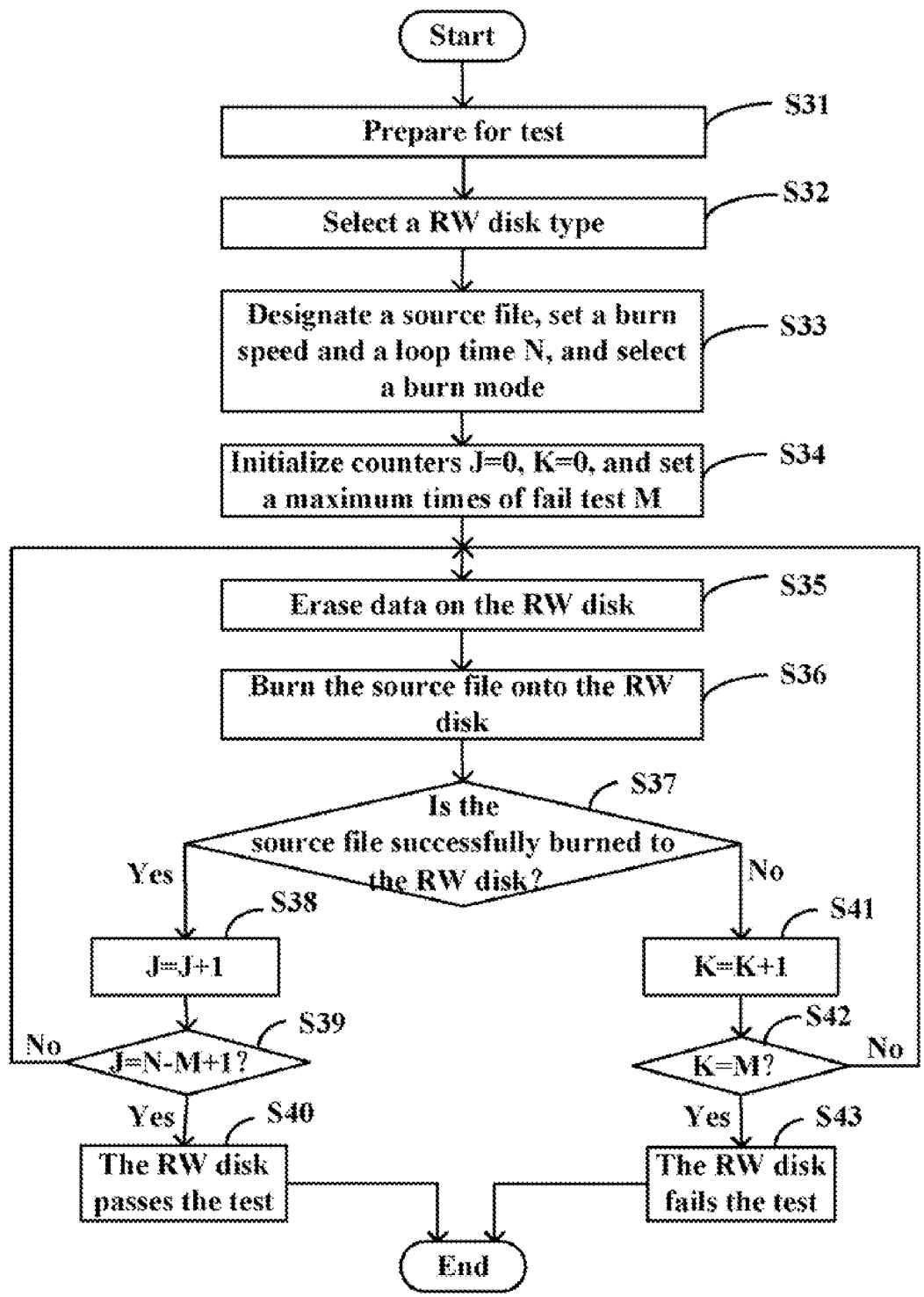
FIG. 3 is a flowchart of a method for testing a RW disk in accordance with one preferred embodiment.

FIG. 3 is a flowchart of a method for testing the RW disk 4 in accordance with another preferred embodiment.

In step S31, the test preparations mainly includes: providing the burner 3 in good burning condition in another preferred embodiment, inserting the RW disk 4 to be tested this occurrence into the burner 3, and connecting the burner 3 to the computer 1.

In step S32, a disk type is selected for the RW disk 4. Depending on the actual type of the RW disk 4, it can be one of the following: CD-RW, DVD-RW, DVD+RW, DVD-RAM, BD-RE and HD DVD-RW. For example, if the RW disk 4 is a DVD-RAM disk, DVD-RAM would be selected as the disk type in step 32.

In step S33, the source file in the database 2 is designated to be burned. A burn speed and a loop time N are set, and a burn mode for the test is selected. The source file can be any type of files to the limitation of not exceeding the capacity of the RW disk 4. The burn speed set in step S33 is limited within the maximal burn speed of the burner 3 and the RW disk 4 in accordance to the specification thereof. The burn mode may be a disk-at-once (DAO) mode, a track-at-once (TAO) mode, a session-at-once (SAO) mode, a packet writing mode and a on the fly (OTF) mode.

In step S34, counters J and K are initialized as J=0, K=0, and a maximum time of fail test M is set while M should be a positive integer. The counter J is configured for counting a time of successfully burned process, and the counter K is configured for counting a time of failed burn process. If J=N−M+1 in the preferred embodiment, the RW disk 4 passes test, which denotes that the RW disk 4 is in good burning condition.

In step S35, all data on the RW disk 4 are erased.

In step S36, the source file is burned onto the RW disk 4.

In step S37, it is to determine whether the source file is successfully burned to the RW disk 4.

In step S38, executing J=J+1 if the source file is successfully burned to the RW disk 4.

In step S39, it is to determine whether j=N−M+1.

In step S40, if J=N−M+1, the RW disk 4 passes the test, which denotes that the RW disk 4 is in good burning condition.

In step S41, executing K=K+1 if the source file fails to be burned to the RW disk 4 in step S37.

In step S42, it is to determine whether K=M.

In step S43, if K=M, the RW disk 4 fails to pass the test, which denotes that the RW disk 4 is defective in burning.

If the determined result in step S39 is J≠N−M+1, return the procedure to step S35.

If the determined results in step S35 is J≠N−M+1 in step S39, return the procedure to step S35.

It should be emphasized that the above-described embodiments of the preferred embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A method for testing a burner, the method comprising the steps of:
   providing a rewriter (RW) disk in good burning condition, and inserting the RW disk into a test burner connected to a computer;
   selecting a burner type for the burner;
   designating a source file to be burned, and setting a counter J=0, a loop time N and a maximum time of fail test M;
   erasing all data on the RW disk;
   burning the source file onto the RW disk;
   determining whether the source file is successfully burned to the RW disk;
   executing J=J+1 if the source file is successfully burned to the RW disk; and
   repeating the erasing step, the burning step and the determining step, and counting a time of successfully burned process by the counter J, until J=N−M+1 which denotes that the burner is in good burning condition.

2. The method according to claim 1, further comprising the step of:
   setting a counter K=0;
   executing K=K+1 if the source file fails to burn onto the RW disk; and
   repeating the erasing step, the burning step and the determining step, and counting a time of failed burn process by the counter K, until K=M which denotes that the burner is defective in burning disks.

3. The method according to claim 1, further comprising the step of setting a burn speed and selecting a burn mode.

4. The method according to claim 1, wherein the burner type is selected from the group consist of COMBO, CDRW, DVDRW, DVD-SuperMulti, Blue-Ray and HD DVD.

5. The method according to claim 3, wherein the burn speed is limited within the maximal burn speed of the burner and the RW disk in accordance with the specification thereof.

6. The method according to claim 3, wherein the burn mode is selected from the group consist of a disk-at-once (DAO) mode, a track-at-once (TAO) mode, a session-at-once (SAO) mode, a packet writing mode and a on the fly (OTF) mode.

7. The method according to claim 1, wherein M and N are positive integers, and M≦N.

8. A method for testing a rewriter (RW) disk, the method comprising the steps of:
   providing a burner in good burning condition, and inserting a test RW disk into the burner that is connected to a computer;
   selecting a disk type for the test RW disk;
   designating a source file to be burned, and setting a counter J=0, a loop time N and a maximum time of fail test M;
   erasing all data on the RW disk;
   burning the source file onto the RW disk determining whether the source file is successfully burned to the RW disk;
   executing J=J+1 if the source file is successfully burned to the RW disk; and
   repeating the erasing step, the burning step and the determining step, and counting a time of successfully burned process by the counter J, until J=N−M+1 which denotes that the RW disk is in good burning condition.

9. The method according to claim 8, further comprising the step of:

setting a counter K=0;

executing K=K+1 if the source file fails to burn onto the RW disk; and repeating the erasing step, the burning step and the determining step, and counting a time of failed burn process by the counter K, until K=M which denotes that the RW disk is defective in burning.

10. The method according to claim 8, further comprising the step of setting a burn speed and selecting a burn mode.

11. The method according to claim 8, wherein the disk type is selected from the group consist of CD-RW, DVD-RW, DVD+RW, DVD-RAM, BD-RE and HD DVD-RW.

12. The method according to claim 10, wherein the burn speed is limited within the maximal burn speed of the burner and the RW disk in accordance to the specification thereof.

13. The method according to claim 10, wherein the burn mode is selected from the group consist of a disk-at-once (DAO) mode, a track-at-once (TAO) mode, a session-at-once (SAO) mode, a packet writing mode and a on the fly (OTF) mode.

14. The method according to claim 8, wherein M and N are positive integers, and $M \leq N$.

* * * * *